(12) United States Patent
Chen et al.

(10) Patent No.: US 10,066,785 B1
(45) Date of Patent: Sep. 4, 2018

(54) DISPLAY SCREEN SUPPORT DEVICE

(71) Applicant: CHEN-SOURCE INC., Taoyuan (TW)

(72) Inventors: Yuan-Chen Chen, Taoyuan (TW); Te-Jung Yuan, Taoyuan (TW)

(73) Assignee: Chen-Source Inc., Taoyuan (TW)

( * ) Notice: Subject to any disclaimer, the term of this patent is extended or adjusted under 35 U.S.C. 154(b) by 0 days.

(21) Appl. No.: 15/703,291

(22) Filed: Sep. 13, 2017

(51) Int. Cl.
| F16M 11/00 | (2006.01) |
| F16M 13/02 | (2006.01) |
| F16C 11/06 | (2006.01) |

(52) U.S. Cl.
CPC ....... *F16M 13/022* (2013.01); *F16C 11/0614* (2013.01); *F16M 2200/027* (2013.01); *F16M 2200/06* (2013.01)

(58) Field of Classification Search
CPC ....... F16M 11/10; F16M 13/022; A47B 21/02
See application file for complete search history.

(56) References Cited

U.S. PATENT DOCUMENTS

| 8,162,268 B1 * | 4/2012 | Huang | F16M 11/08 |
| | | | 248/124.1 |
| 8,342,462 B2 * | 1/2013 | Sapper | F16M 11/10 |
| | | | 248/124.1 |
| 8,717,506 B2 * | 5/2014 | Austin | F16M 11/125 |
| | | | 348/836 |
| 9,746,124 B2 * | 8/2017 | Smed | F16M 11/10 |
| 9,848,756 B2 * | 12/2017 | Kan | A61B 1/00048 |
| 2014/0245932 A1 * | 9/2014 | McKenzie | A47B 21/02 |
| | | | 108/50.01 |

* cited by examiner

*Primary Examiner* — Amy Jo Sterling
(74) *Attorney, Agent, or Firm* — Muncy, Geissler, Olds & Lowe, P.C.

(57) ABSTRACT

A display screen support device includes a base unit providing an upright shaft and a stop member at the upright shaft, a first support arm including a first pivot-connection device coupled to the upright shaft and supported on the stop member and a first extension device transversely extended from the first pivot-connection device for supporting a display screen, and a second support arm including a second pivot-connection device coupled to the first pivot-connection device and a second extension device transversely extended from the second pivot-connection for supporting another display screen. The second pivot-connection device of the second support arm relative can be biased relative to the first pivot-connection device of the first support arm within a limited angle for allowing adjustment of the relative angular position between the two supported display screens.

10 Claims, 10 Drawing Sheets

DISPLAY SCREEN SUPPORT DEVICE

BACKGROUND OF THE INVENTION

1. Field of the Invention

The present invention relates to display screen support technology and more particularly, to a display screen support device, which has a simple structure and is practical for supporting two display screens, allowing adjustment of the relative angular position between the two supported display screens.

2. Description of the Related Art

Monitors and TV display screens are popularly used in today's home life, offices, schools and workstations are very popular. Due to the drawbacks of being bulky with poor quality and capable of receiving analog signal only, the early cathode ray tube type display screens have been eliminated by the market. Nowadays, LCD or plasma-type display screens have been widely used to replace conventional cathode ray tube type designs for the advantages of having light, thin, clear picture characteristics and being capable of receiving analog and digital signals. However, commercial display screens stands simply allow view angle adjustment with a small range. During display screen view angle adjustment, the user must pay attention to the location of the center of gravity of the display screen to avoid dumping. A display screen can be mounted in a wall or at a high place. However, commercial wall mount type display screen support designs do not allow easy adjustment of the view angle of the supported display screen, limiting the application.

In order to meet the user's need to adjust display screen angular position and to minimize desktop or workstation installation space, angle-adjustable display screen support devices. These conventional angle-adjustable display screen support devices can be installed on a desktop, pylons or wall by clamp means or hanging means. Further, these conventional angle-adjustable display screen support devices have a number of swivel arms coupled to one another, facilitating the user to adjust the display screen view angle or elevation. However, these conventional angle-adjustable display screen support devices are simply designed for supporting one single display screen. In certain application situations, people may have a need for dual-screen synchronization for division of labor or multi-work monitoring, making the work more convenient and efficient. Mounting two display screen support devices on a tabletop occupy much tabletop space and make the display screen view angle adjustment work inconvenient. This manner will affect the user's work and efficiency. An improvement in this regard is necessary.

SUMMARY OF THE INVENTION

The present invention has been accomplished under the circumstances in view. It is the main object of the present invention to provide a display screen support device, which is practical for supporting two display screens, allowing adjustment of the relative angular position between the two supported display screens.

To achieve this and other objects of the present invention, a display screen support device comprises a base unit, a first support arm and a second support arm. The base unit comprises an upright shaft, and a stop member provided at the upright shaft. The first support arm comprises a first pivot-connection device and a first extension device. The first pivot-connection device comprises a first axial mounting hole coupled to the upright shaft and supported on the stop member, and a stop block transversely extended from the periphery thereof. The first extension device is transversely extended from the first pivot-connection device for supporting a display screen. The second support arm comprises a second pivot-connection device and a second extension device. The second pivot-connection device comprises a barrel, a second axial mounting hole extending through opposing top and bottom ends of the barrel and coupled to the first pivot-connection device, a position-limiting opening upwardly extended from the bottom end of the barrel and disposed in communication with the second axial mounting hole and attached onto the stop block, and two bearing edges defined in the position-limiting opening at two opposite sides for abutment against the first pivot-connection device. The second extension device is transversely extended from the second pivot-connection device remote from the position-limiting opening for supporting another display screen. When biasing the second pivot-connection device of the second support arm relative to the first pivot-connection device of the first support arm, one bearing edge is stopped at the stop block to limit the biasing angle of the second pivot-connection device. Thus, the display screen support device has a simple structure and allows the user to conveniently adjust the relative angular position between the two supported display screens.

Preferably, the first support arm and the second support arm each further comprise a display screen mounting head. The display screen mounting head comprises a body block, a sliding coupling plate located at a back side of the body block and slidably coupled to the sliding rail chamber of the outer rail thereof, and a locating plate located at an opposing front side of the body block for the mounting of a display screen. By means of the respective display screen mounting head, each supported display screen can be moved transversely along the first extension device or second extension device to the desired location.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
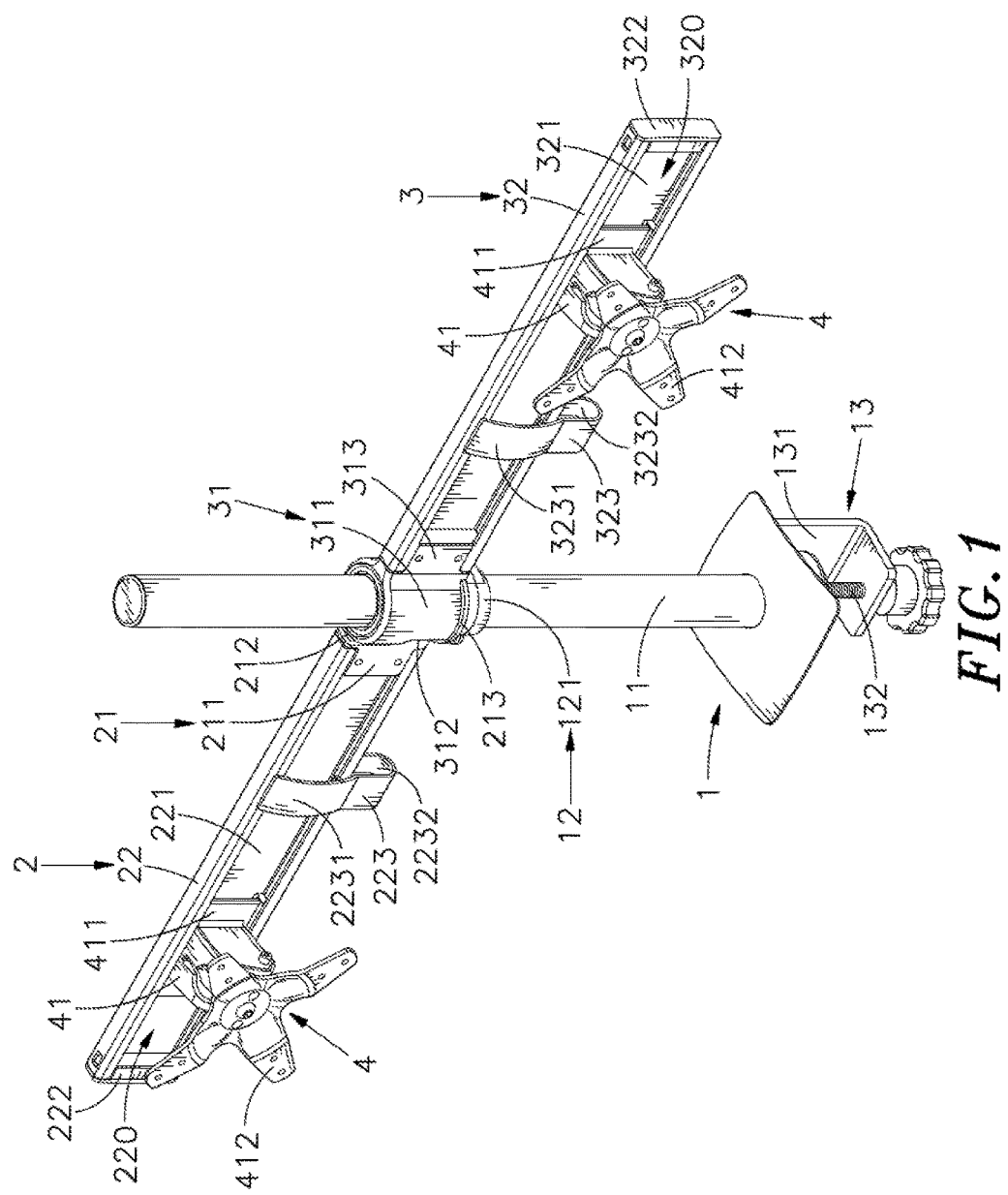
FIG. 1 is an oblique top elevational view of a display screen support device in accordance with the present invention.
Figure 2:
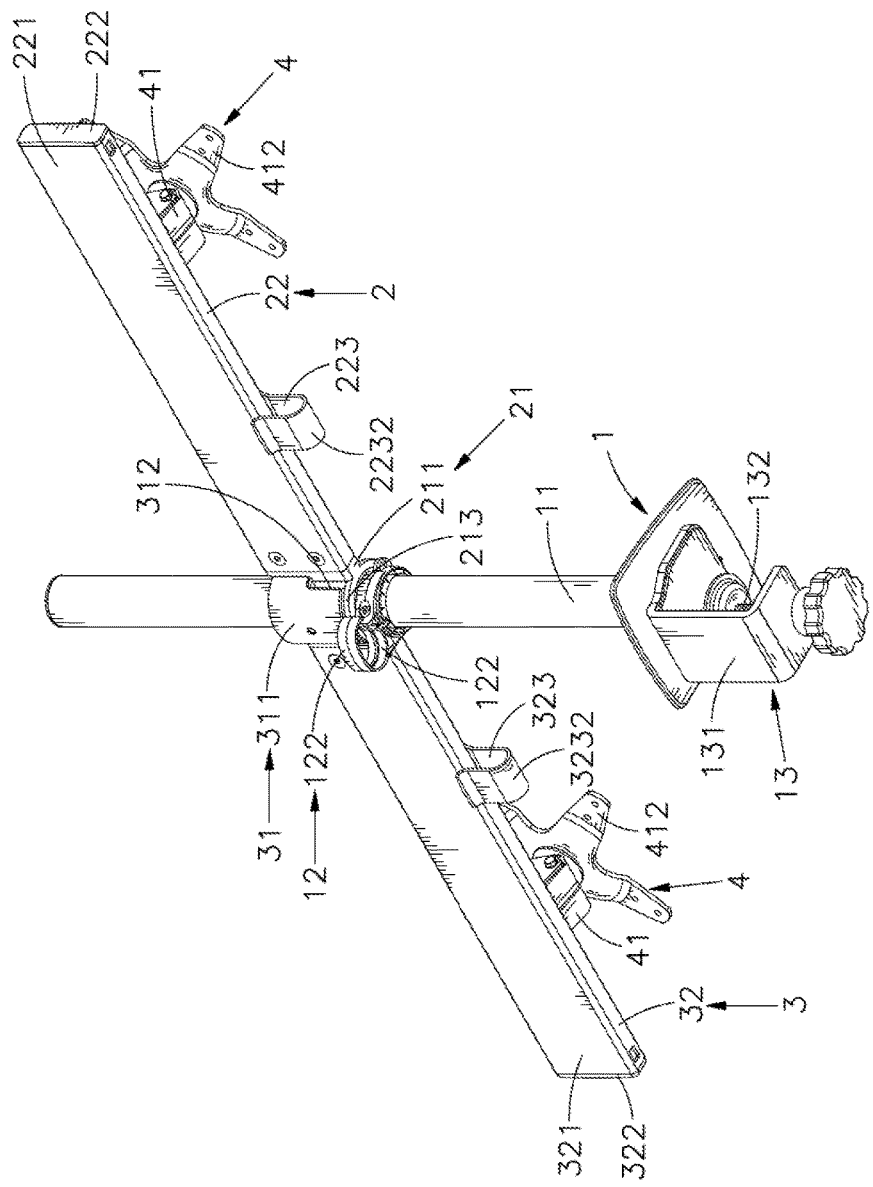
FIG. 2 corresponds to FIG. 1 when viewed from another angle.
Figure 3:
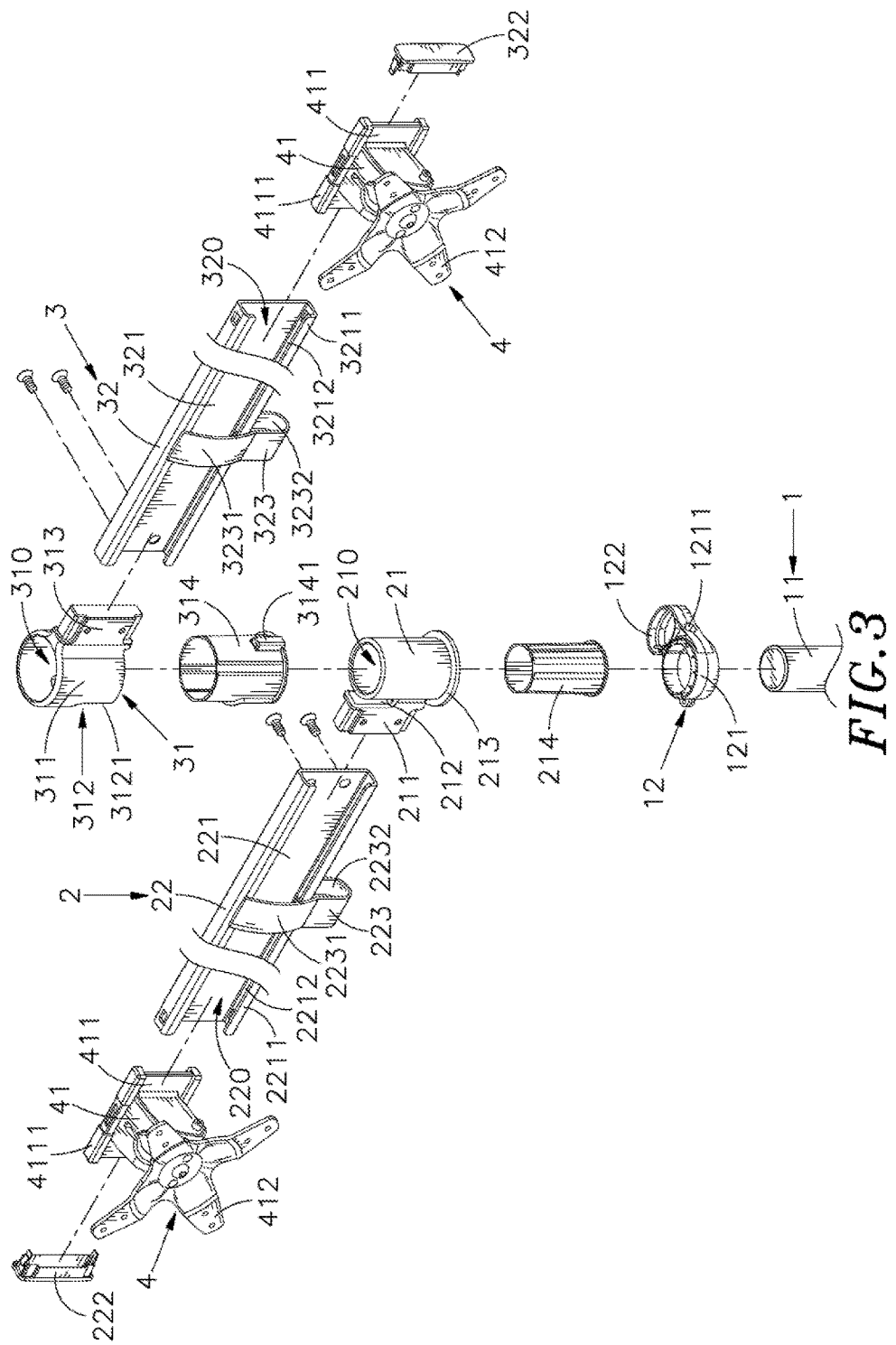
FIG. 3 is an exploded view of the display screen support device in accordance with the present invention.
Figure 4:
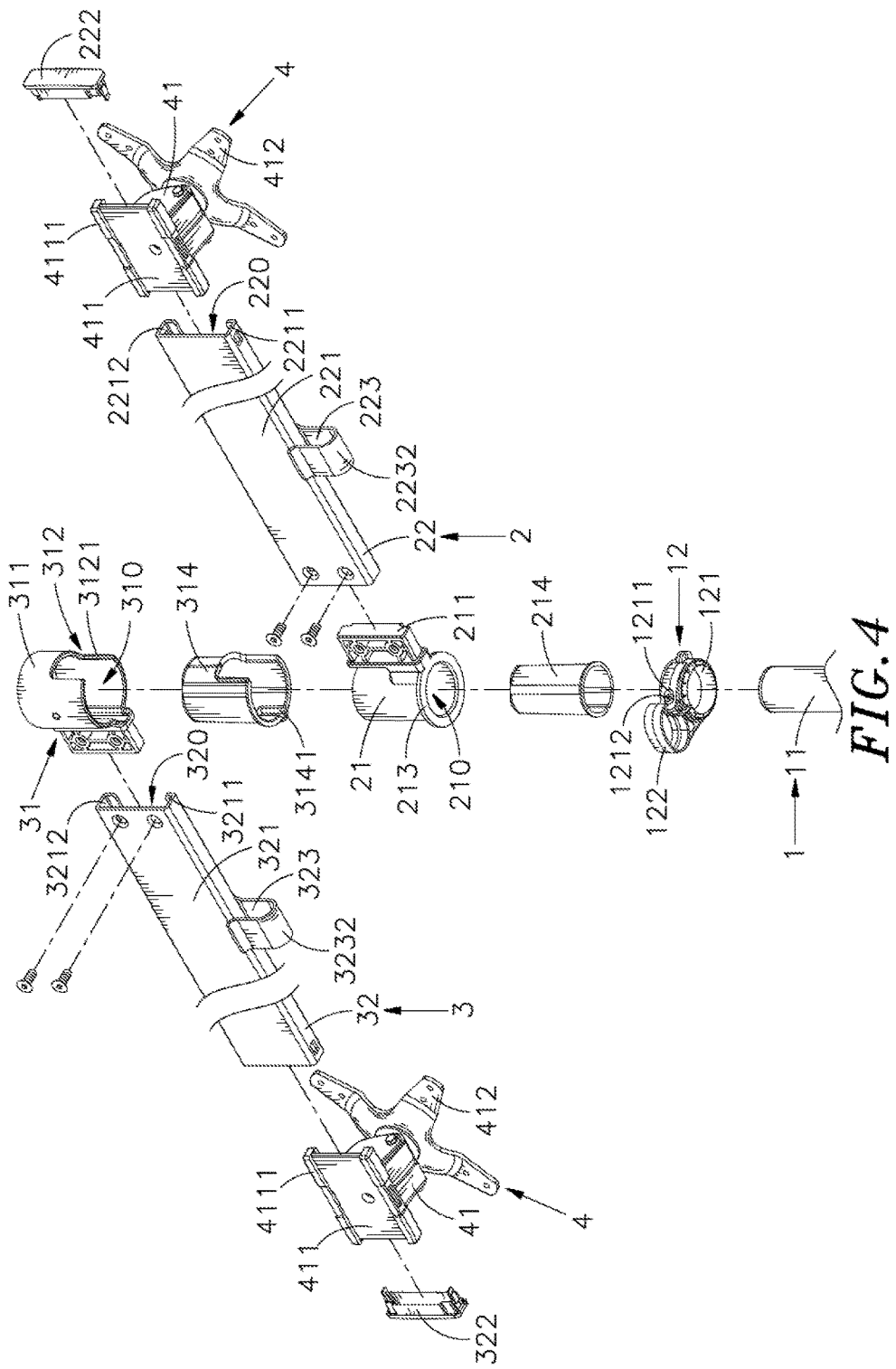
FIG. 4 corresponds to FIG. 3 when viewed from another angle.
Figure 5:
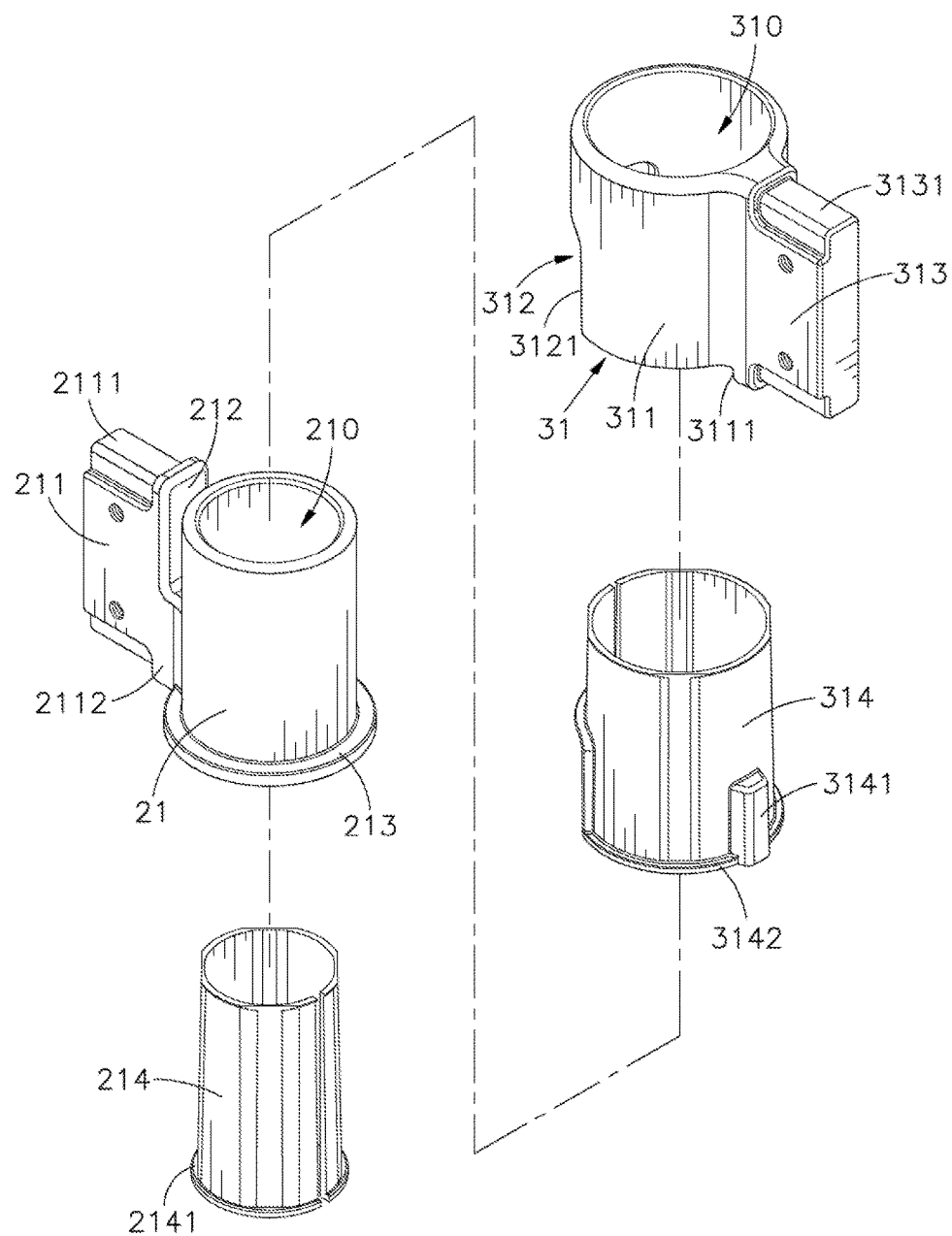
FIG. 5 is an exploded view of a part of the first and second support arm.
Figure 6:
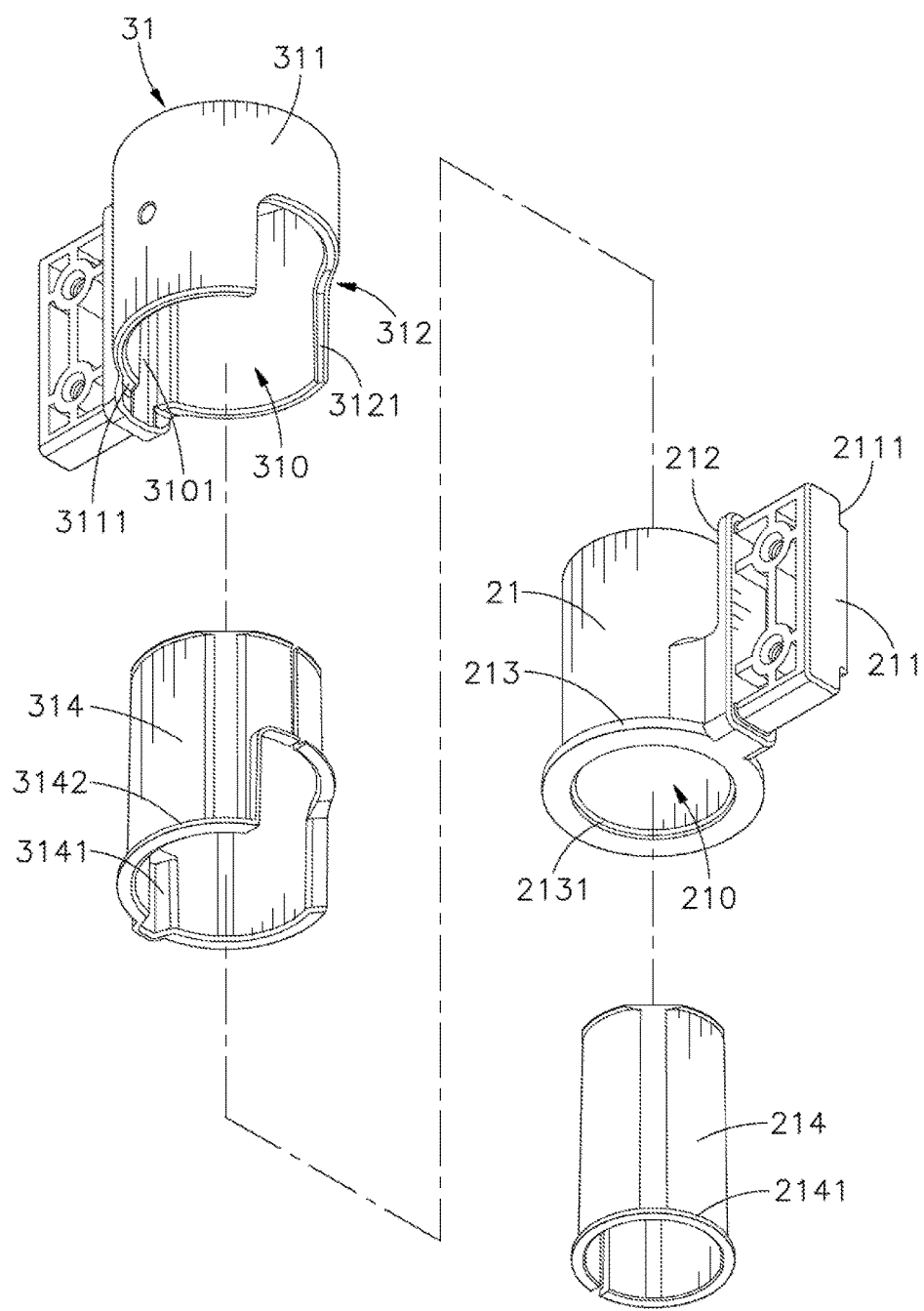
FIG. 6 corresponds to FIG. 5 when viewed from another angle.

Referring to FIGS. 1-6, a display screen support device in accordance with the present invention is shown. The display screen support device comprises a base unit 1, a first support arm 2 and a second support arm 3.

The base unit 1 comprises an upright shaft 11, a stop member 12 that can be, for example, a shaft clamp 121 mounted around the periphery of the upright shaft 11 for stopping the first support arm 2 and the second support arm 3 at a predetermined elevation, and a mounting assembly 13 provided at a bottom end of the upright shaft 11 for fastening to, for example, a tabletop. The shaft clamp 121 is slidably sleeved onto the upright shaft 11 of the base unit 1, having a tightening up screw 1212 mounted in a through hole 1211 thereof. When fastened tight the tightening up screw 1212, the shaft clamp 121 is locked to the upright shaft 11 of the base unit 1. The shaft clamp 121 has a cable management ring 122 located at the outer perimeter thereof for holding cables in place. The mounting assembly 13 in the present preferred embodiment comprises a C-shaped mounting shaft 131 mountable on a border edge of a tabletop, and a tension clamp 132 for locking the C-shaped mounting shaft 131 to the tabletop. In actual application, the mounting assembly 13 can be made in the form of a wall mount or the like that can be fastened to a wall or any other support means.

The first support arm 2 comprises a first pivot-connection device 21 and a first extension device 22. The first pivot-connection device 21 comprises a first axial mounting hole 210 coupled to the upright shaft 11, a stop block 211 transversely extended from the periphery thereof, two engagement block 2111 respectively protruded from opposing top and bottom sides of the stop block 211, an opening 212 facing upward between the first axial mounting hole 210 and the stop block 211 and defining two opposing abutment surfaces 2112, a stop flange 213 extended around a bottom end of the first axial mounting hole 210 for stopping at a top side of the shaft clamp 121, and an annular accommodation groove 2131 defined in a bottom side of the stop flange 213 in communication with the first axial mounting hole 210. Preferably, an inner bushing 214 is mounted in the first axial mounting hole 210 of the first pivot-connection device 21. The inner bushing 214 has an annular bottom flange 2141 engaged in the annular accommodation groove 2131.

In the present preferred embodiment, the first pivot-connection device 21 and the first extension device 22 are two separated members detachably fastened together. In actual application, the first pivot-connection device 21 and the first extension device 22 can be integrally made in one piece. In the present preferred embodiment, the first extension device 22 comprises an outer rail 221 having two opposing L-shaped side guide flanges 2211 respectively extended along two opposite lateral sides thereof at right angles, a rail groove 2212 defined in each the side guide flange 2211 along the length thereof, and a sliding rail chamber 220 defined in the outer rail 221 between the two side guide flanges 2211. The engagement blocks 2111 of the first pivot-connection device 21 are respectively engaged in the rail grooves 2212 in the side guide flanges 2211 of the outer rail 221 in one end of the sliding rail chamber 220 and then fixedly fastened thereto with screws. Further, an end cap 222 is fastened to an opposing end of the sliding rail chamber 220 of the outer rail 221. Further, a cable management clip 223 is provided at a front side of the outer rail 221. The cable management clip 223 comprises a sliding clip head 2231 coupled to and slidable along the side guide flanges 2211, and a U-shaped clip hook 2232 extended from a bottom side of the for holding cables in place.

The second support arm 3 comprises a second pivot-connection device 31 and a second extension device 32. The second pivot-connection device 31 comprises a barrel 311 attached onto the first pivot-connection device 21 and rested in the opening 212, a second axial mounting hole 310 extending through opposing top and bottom ends of the barrel 311 and coupled to the first pivot-connection device 21, a position-limiting opening 312 upwardly extended from the bottom end of the barrel 311 to about one half of the height of the barrel 311 and disposed in communication with the second axial mounting hole 310 and attached onto the stop block 211, two bearing edges 3121 defined in the position-limiting opening 312 at two opposite sides for abutment by the respective abutment surfaces 2112 to limit the angle of rotation α of the second pivot-connection device 31 relative to the first pivot-connection device 21, a coupling groove 3111 defined in the bottom end of the barrel 311 for receiving the stop flange 213 to keep the bottom side of the first pivot-connection device 21 and the bottom side of the second pivot-connection device 31 in flush, an engagement groove 3101 defined in the second axial mounting hole 310 inside the barrel 311 remote from the position-limiting opening 312, a mounting block 313 transversely extended from the outer perimeter of the barrel 311 corresponding to the engagement groove 3101, and two engagement blocks 3131 respectively protruded from opposing top and bottom sides of the mounting block 313. Preferably, an outer bushing 314 is mounted in the second axial mounting hole 310 of the second pivot-connection device 31. The outer bushing 314 comprises a locating block 3141 protruded from the outer perimeter thereof and engaged into the engagement groove 3101 in the barrel 311, and an annular bottom flange 3142 located at a bottom side thereof and stopped between the stop flange 213 and the coupling groove 3111.

In the present preferred embodiment, the second pivot-connection device 31 and the second extension device 32 are two separated members detachably fastened together. In actual application, the second pivot-connection device 31 and the second extension device 32 can be integrally made in one piece. In the present preferred embodiment, the second extension device 32 comprises an outer rail 321 having two opposing L-shape side guide flanges 3211 respectively extended along two opposite lateral sides thereof at right angles, a rail groove 3212 defined in each the side guide flange 3211 along the length thereof, and a sliding rail chamber 320 defined in the outer rail 321 between the two side guide flanges 3211. The engagement blocks 3131 of the second pivot-connection device 31 are respectively engaged in the rail grooves 3212 in the side guide flanges 3211 of the outer rail 321 in one end of the sliding rail chamber 320 and then fixedly fastened thereto with screws. Further, an end cap 322 is fastened to an opposing end of the sliding rail chamber 320 of the outer rail 321. Further, a cable management clip 323 is provided at a front side of the outer rail 321. The cable management clip 323 comprises a sliding clip head 3231 coupled to and slidable along the side guide flanges 3211, and a U-shaped clip hook 3232 extended from a bottom side of the for holding cables in place.

The display screen support device further comprises two display screen mounting heads 4. Each the display screen mounting head 4 comprises a body block 41, a sliding coupling plate 411 located at a back side of the body block 41 and inserted into the sliding rail chamber 220 or 320, two sliding guide ribs 4111 respectively extended along two opposite lateral sides of the sliding coupling plate 411 and respectively slidably coupled to the respective rail grooves 2212 or 3212 in the respective side guide flanges 2211 or 3211, and a locating plate 412 located at an opposing front side of the body block 41. The body block 41 and the locating plate 412 can be integrally made in one piece. Alternatively, the body block 41 and the locating plate 412 can be two separated members and then connected together with, for example, a ball and socket joint.

Figure 7:
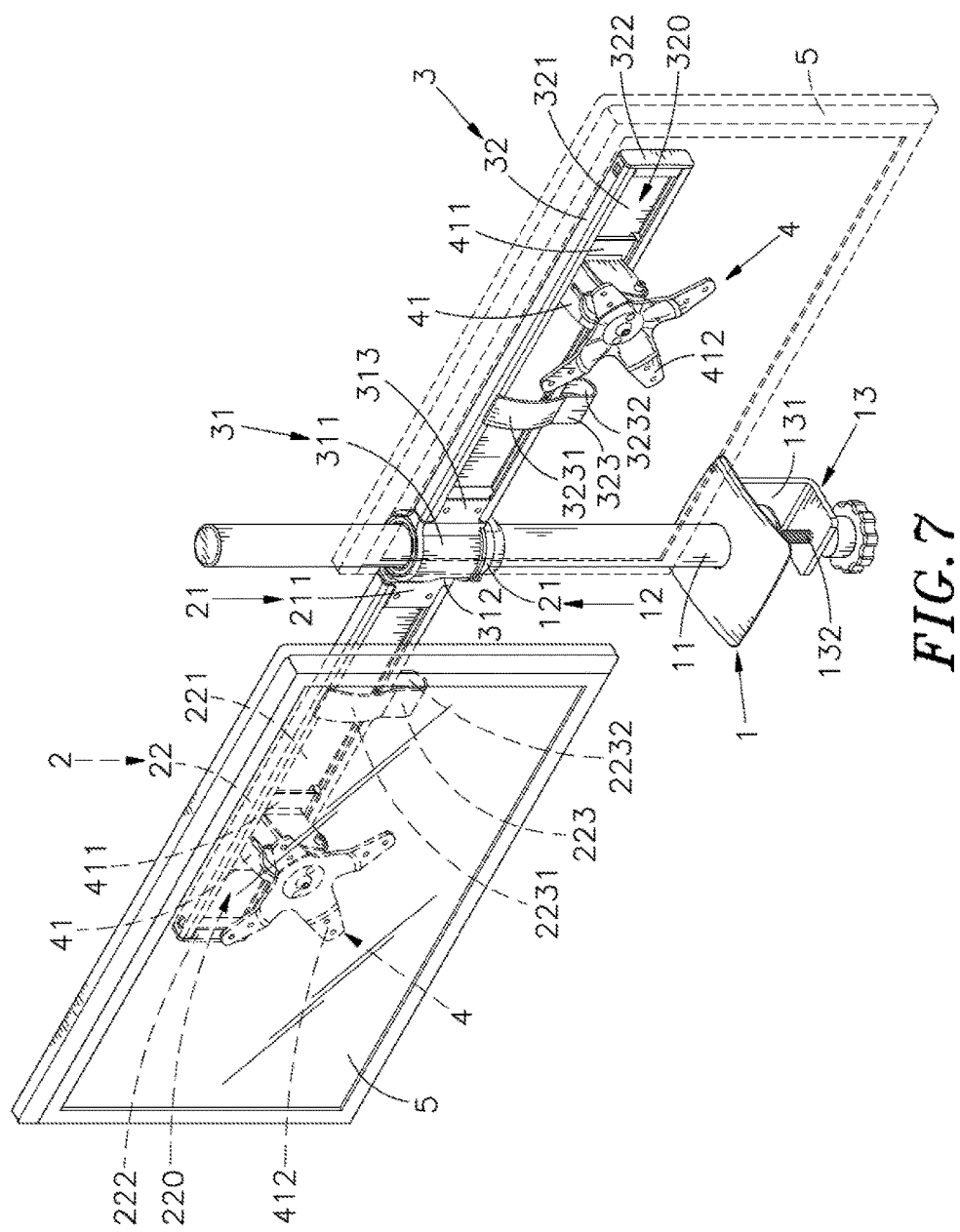
FIG. 7 is a perspective applied view of the present invention.
Figure 8:
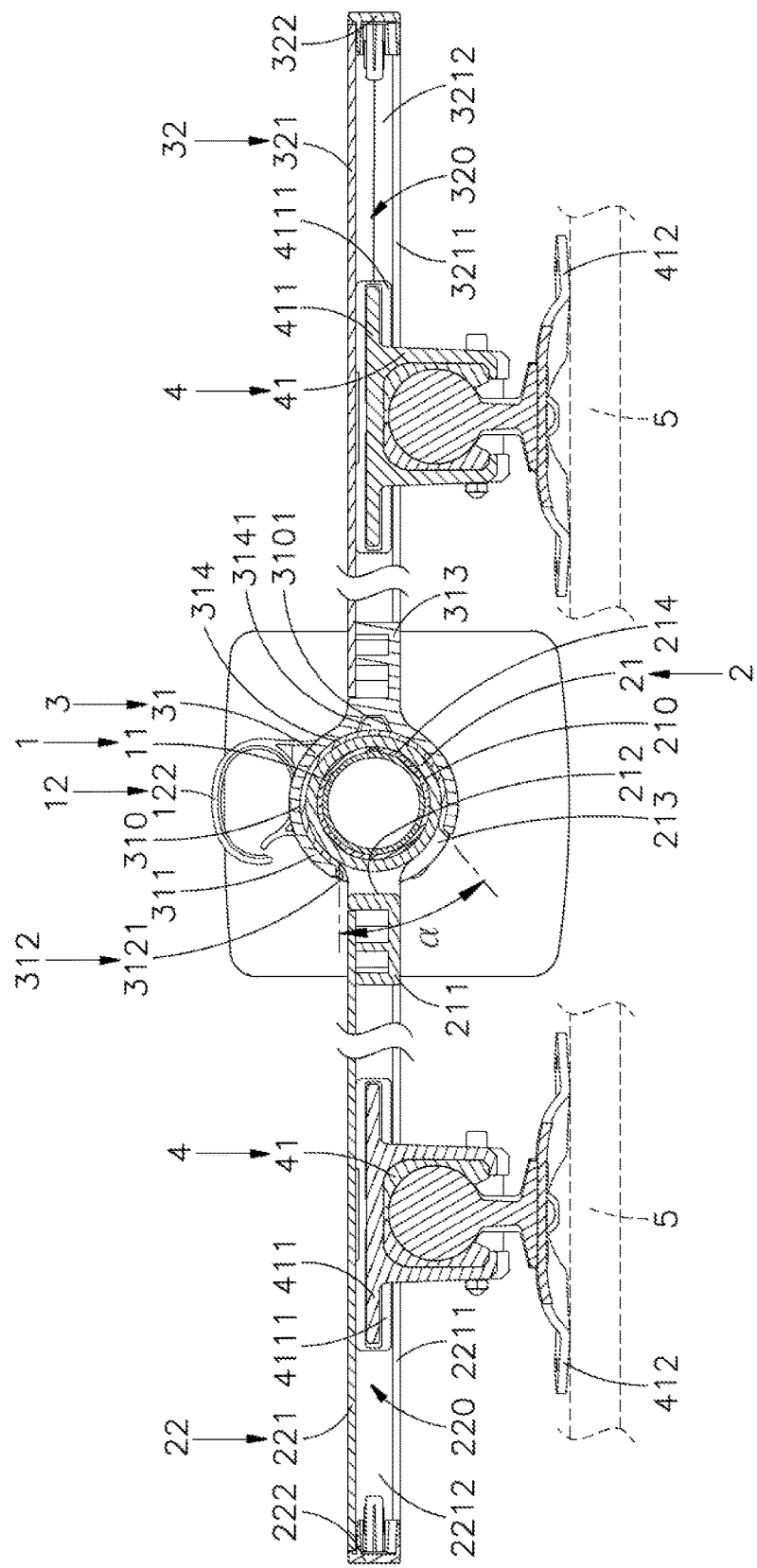
FIG. 8 is a sectional top view of FIG. 7.
Figure 9:
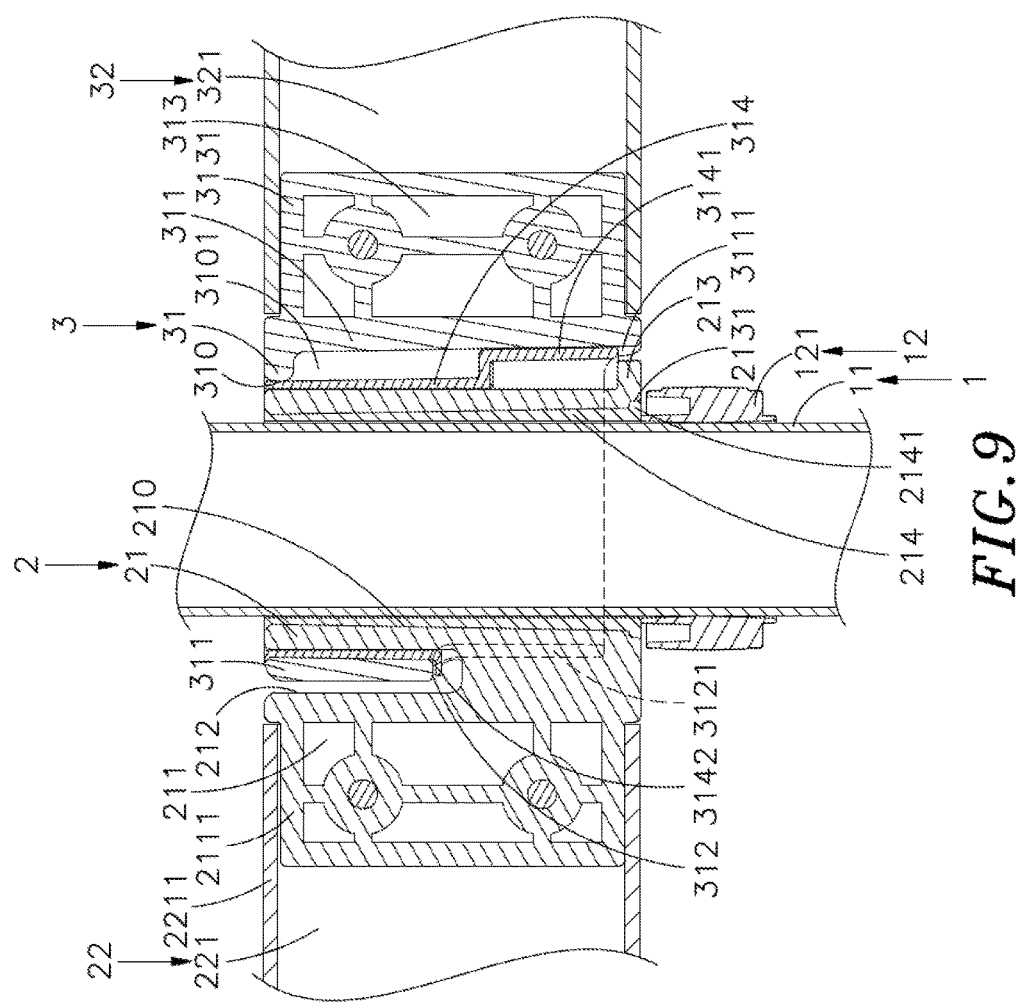
FIG. 9 is a sectional front view of FIG. 7.
Figure 10:
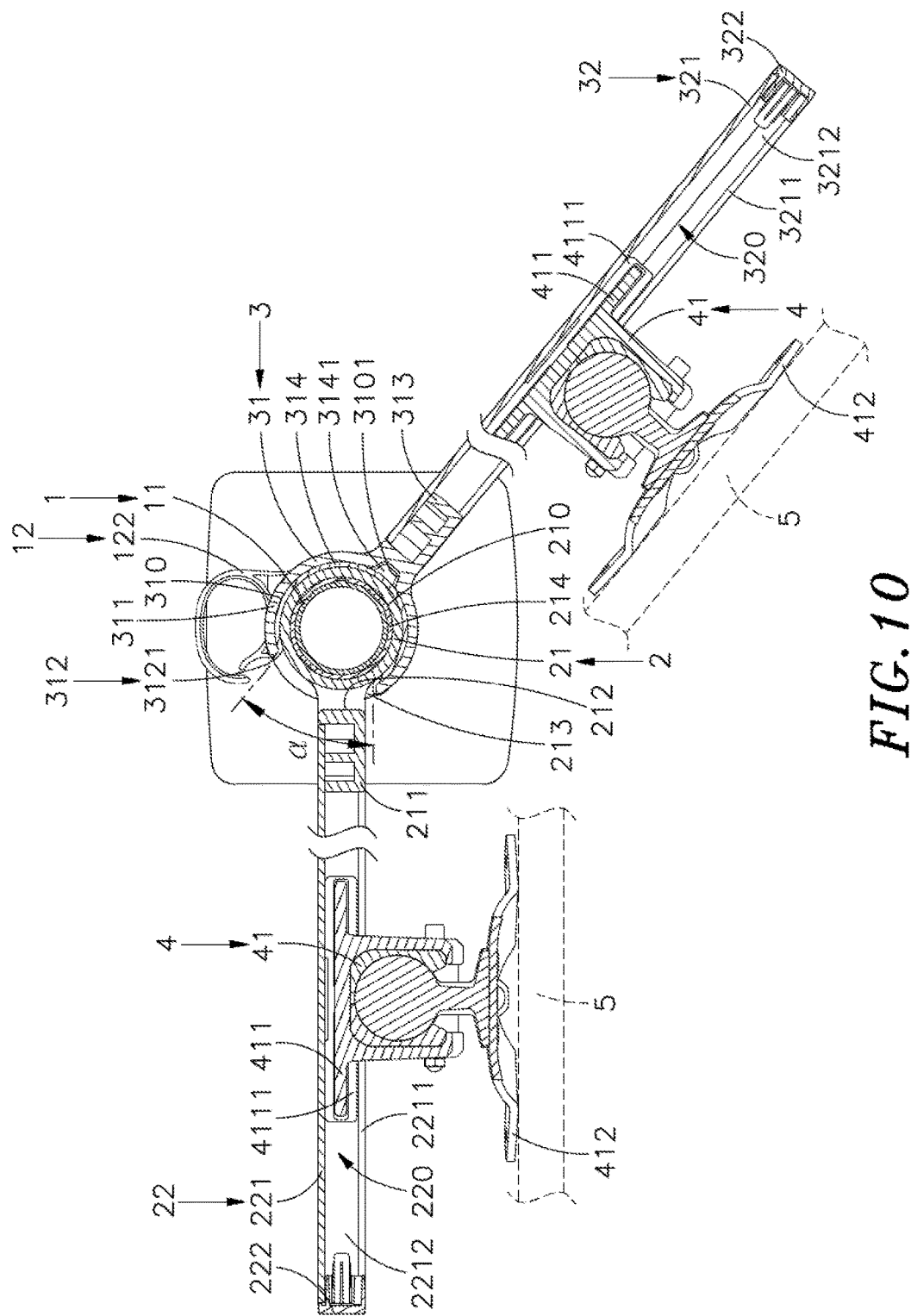
FIG. 10 corresponds to FIG. 8, illustrating the relative angular position between the first support arm and the second support arm adjusted.

The application of the display screen support device of the present invention will be explained hereinafter with reference to FIGS. 7-10. The display screen support device can be used for supporting any type of display screens, including desktop or industrial display screens, interactive or medical-type cantilever screens and workstation screens. In installation, the base unit 1 can be directly mounted at a cantilever or the swivel arm of support. By means of the mounting assembly 13, the base unit 1 can be fastened to a corner of a tabletop or affixed to a wall. Two display screen 5 to be used can be respectively affixed to the locating plates 412 of the two display screen mounting heads 4 of the display screen support device. Through the sliding coupling plates 411, the two display screen mounting heads 4 can be respectively moved in the sliding rail chamber 220 of the first extension device 22 and the sliding rail chamber 320 of the second extension device 32 to the desired location. Alternatively, the display screens 5 can be respectively and directly affixed to the first support arm 2 and the second support arm 3 without using the display screen mounting heads 4.

When wishing to adjust the elevation of the display screens 5, use a hand tool to loosen the tightening up screw 1212 of the shaft clamp 121, and then move the shaft clamp 121 along the upright shaft 11 of the base unit 1 to the desired elevation, and then fasten tight the tightening up screw 1212 to lock the shaft clamp 121 to the upright shaft 11 at the bottom side of the first support arm 2 and the second support arm 3. Because the size of the shaft clamp 121 is greater than the diameter of the first axial mounting hole 210 of the first pivot-connection device 21, the first pivot-connection device 21 can be positively supported on the shaft clamp 121, and thus, the two display screens 5 are held at the desired elevation.

When wishing to adjust the angular position of the display screens 5 relative to the upright shaft 11 of the base unit 1, bias one display screen 5 to turn the respective display screen mounting head 4 and the first pivot-connection device 21 of the first support arm 2 or the second pivot-connection device 31 of the second support arm 3 leftward or rightward about the upright shaft 11. Because the second pivot-connection device 31 is coaxially coupled to the first pivot-connection device 21, the second support arm 3 is turned with the first support arm 2 about the upright shaft 11 at this time. When the user biases the display screen 5 at the second support arm 3, the second pivot-connection device 31 is rotated relative to the first pivot-connection device 21 of the first support arm 2 to the extent where one bearing edge 3121 in the position-limiting opening 312 is abutted against one of the two abutment surfaces 2112 of the stop block 211, and thus, the angle of rotation α of the second pivot-connection device 31 relative to the first pivot-connection device 21 is limited to a predetermined range. Thus, the user can adjust the relative angular position between the two display screens 5 conveniently.

As stated above, the first axial mounting hole 210 of the first pivot-connection device 21 of the first support arm 2 is coupled to the upright shaft 11 of the base unit 1 and supported on the stop member 12; the stop block 211 is disposed at the border area of the first pivot-connection device 21; the second axial mounting hole 310 that is defined in the barrel 311 of the second pivot-connection device 31 of the second support arm 3 is coaxially coupled to the first pivot-connection device 21; the position-limiting opening 312 of the barrel 311 is attached onto the stop block 211; the first extension device 22 is extended from the first pivot-connection device 21 of the first support arm 2 for supporting one display screen 5; the second extension device 32 is extended from the second pivot-connection device 31 of the second support arm 3 for supporting another display screen 5; when turning the second pivot-connection device 31 of the second support arm 3 relative to the first pivot-connection device 21 of the first support arm 2, one bearing edge 3121 in the position-limiting opening 312 will be stopped against the stop block 211 to limit the angle of rotation.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A display screen support device, comprising:
a base unit comprising an upright shaft and a stop member provided at said upright shaft;
a first support arm comprising a first pivot-connection device and a first extension device, said first pivot-connection device comprising a first axial mounting hole coupled to said upright shaft and supported on said stop member and a stop block transversely extended from the periphery thereof, said first extension device being transversely extended from said first pivot-connection device for supporting a display screen; and
a second support arm comprising a second pivot-connection device and a second extension device, said second pivot-connection device comprising a barrel, a second axial mounting hole extending through opposing top and bottom ends of said barrel and coupled to said first pivot-connection device, a position-limiting opening upwardly extended from the bottom end of said barrel and disposed in communication with said second axial mounting hole and attached onto said stop block and two bearing edges defined in said position-limiting opening at two opposite sides for abutment against said first pivot-connection device, said second extension device being transversely extended from said second pivot-connection device remote from said position-limiting opening for supporting the another display screen;
wherein when biasing said second pivot-connection device of said second support arm relative to said first pivot-connection device of said first support arm, one said bearing edge is stoppable at said stop block to limit the biasing angle of said second pivot-connection device.

2. The display screen support device as claimed in claim 1, wherein said base unit further comprises a shaft clamp mounted around the periphery of said upright shaft for stopping said first support arm and said second support arm at a predetermined elevation and defining therein a through hole, a tightening up screw mounted in said through hole of said shaft clamp to lock said shaft clamp to said upright shaft, and a cable management ring extended from the periphery of said shaft clamp.

3. The display screen support device as claimed in claim 1, wherein said first support arm further comprises an opening facing upward between said first axial mounting hole and said stop block; said barrel of said second support arm is attached onto said first pivot-connection device and rested in said opening; the depth of said position-limiting opening being greater than one half of the height of said barrel.

4. The display screen support device as claimed in claim 3, wherein said first support arm further comprises two opposing abutment surfaces defined in said opening at two opposite sides for abutment against the respective bearing edges in said position-limiting opening to limit the angle of rotation of said second pivot-connection device relative to said first pivot-connection device; a first extension device is joined to and transversely outwardly extended from said stop block.

5. The display screen support device as claimed in claim 1, wherein said first support arm further comprises a stop flange extended around a bottom end of said first axial mounting hole of said first pivot-connection device for stopping against said stop member, and an inner bushing mounted in said first axial mounting hole; said second support arm further comprises an outer bushing mounted in said second axial mounting hole of said second pivot-connection device; said second pivot-connection device further comprises a coupling groove defined in the bottom end of said barrel for receiving said stop flange.

6. The display screen support device as claimed in claim 1, wherein said second support arm further comprises a mounting block transversely extended from the periphery of said barrel remote from said position-limiting opening and connected with said second extension device.

7. The display screen support device as claimed in claim 1, wherein said first support arm and said second support arm each further comprise a display screen mounting head, said display screen mounting head comprising a body block, a sliding coupling plate located at a back side of said body block and slidably coupled to the a sliding rail chamber of the an outer rail of said first extension device or said second extension device, and a locating plate located at an opposing front side of said body block for the mounting of said display screen.

8. The display screen support device as claimed in claim 7, wherein the said outer rail of said first extension device is connected to and transversely extended from a stop block, comprising two side guide flanges respectively extended along two opposite lateral sides thereof at right angles, and a rail groove defined in each said side guide flange; each said display screen mounting head further comprises two sliding guide ribs respectively extended along two opposite lateral sides of the respective said sliding coupling plate and respectively slidably coupled to the respective said rail grooves in the respective side guide flanges of the respective said outer rail of said first support arm or said second support arm.

9. The display screen support device as claimed in claim 7, wherein said second support arm further comprises a mounting block transversely extended from the periphery of a barrel remote from a position-limiting opening and connected with a second pivot-connection device; said outer rail of said first extension device is connected to and transversely extended from a stop block, comprising two side guide flanges respectively extended along two opposite lateral sides thereof at right angles, and a rail groove defined in each said side guide flange; each said display screen mounting head further comprises two sliding guide ribs respectively extended along two opposite lateral sides of the respective said sliding coupling plate and respectively slidably coupled to the respective said rail grooves in the respective side guide flanges of the respective said outer rail of said first support arm or said second support arm.

10. The display screen support device as claimed in claim 7, wherein the said outer rails of said first extension device and said second extension device respectively provide a cable management clip, said cable management clip comprising a sliding clip head slidably coupled to the respective said outer rail and a U-shaped clip hook extended from a bottom end of said sliding clip head for holding cables.

\* \* \* \* \*